United States Patent [19]
Johnson

[11] Patent Number: 6,050,894
[45] Date of Patent: Apr. 18, 2000

[54] FEEDING CROP TO THE ROTOR OF AN AXIAL FLOW COMBINE HARVESTER

[76] Inventor: Marlin Johnson, Box 133, Starbuck, Manitoba, Canada, R0G 2P0

[21] Appl. No.: 09/044,153

[22] Filed: Mar. 19, 1998

[51] Int. Cl.⁷ .................................................. A01F 12/10
[52] U.S. Cl. .............................................. 460/68; 460/70
[58] Field of Search ................................. 460/70, 16, 20, 460/68, 69, 119

[56] References Cited

U.S. PATENT DOCUMENTS

| | | |
|---|---|---|
| 4,489,733 | 12/1984 | Underwood ............................... 460/68 |
| 5,145,462 | 9/1992 | Tanis et al. ........................... 460/70 X |
| 5,387,153 | 2/1995 | Tanis ..................................... 460/70 X |
| 5,497,605 | 3/1996 | Underwood et al. .................. 460/70 X |

Primary Examiner—H. Shackelford
Attorney, Agent, or Firm—Adrian D. Battison; Murray E. Thrift

[57] ABSTRACT

An impeller blade for the rotor of an axial flow combine harvester is shaped such that an outer blade portion has a shape of the blade portion defining an inclined edge which joins a forward blade edge lying in a radial plane of the rotor at a first position spaced outwardly from the hub of the rotor and joins the outer blade edge at a second position spaced rearwardly of the first position, the inclined edge having at least a part thereof which is substantially straight and parallel to an inner blade edge so as to be inclined at an angle to the outer blade edge and extend outwardly and rearwardly from the first position to the second position such that the radial distance of the second position from the axis is greater than that of the first position. This reduces the length of the forward edge to 50% to 75% of its conventional length and acts to overcome a long standing feeding problem of this type of rotor in some crops.

14 Claims, 3 Drawing Sheets

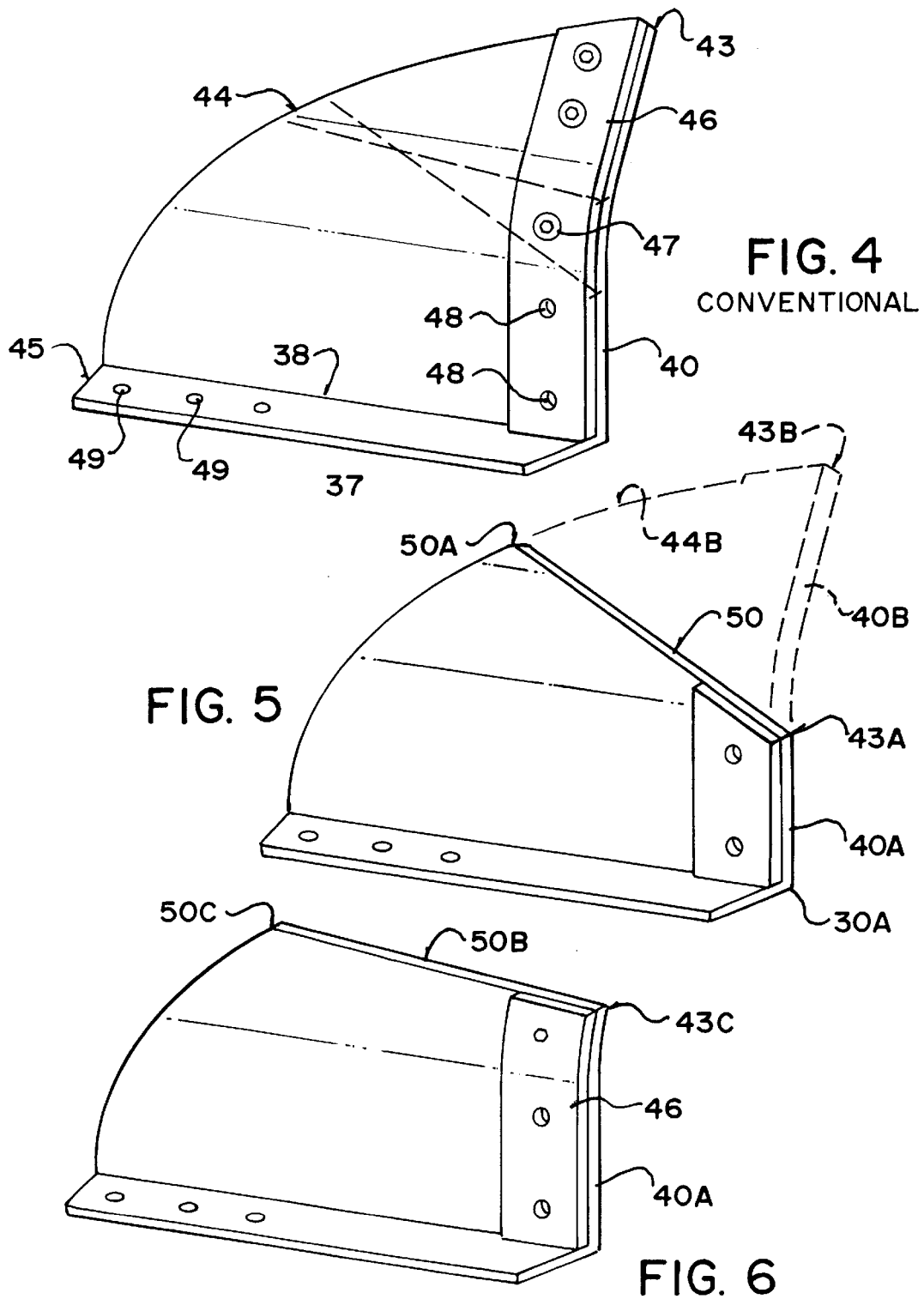

FEEDING CROP TO THE ROTOR OF AN AXIAL FLOW COMBINE HARVESTER

This invention relates to an axial flow combine harvester and particularly to improvements in the arrangement for feeding crop material from the feeder housing into the forward end of the rotor.

BACKGROUND OF THE INVENTION

Axial flow or rotary combine harvesters are well known and manufactured by different companies. Generally the harvester comprises a combine rotor having a generally cylindrical body defining an outer rotor surface and mounted for rotation about a longitudinal axis of the body; a generally cylindrical concave assembly in which the rotor is mounted for rotation such that the rotor is substantially surrounded by a plurality of concave elements facing inwardly and arranged to cooperate with the outer rotor surface for effecting a threshing and separating action on the crop material passing through a generally cylindrical area between the rotor and the concave assembly; an impeller feed section at a forward end of the rotor and rotatable therewith for feeding the crop material rearwardly into the cylindrical area; a generally frusto-conical housing portion surrounding the impeller feed section and converging inwardly and rearwardly from a front feed mouth to the concave assembly such that rotation of the impeller feed section within the housing portion causes a rearward flow of the crop material from the mouth to the cylindrical area; and a feeder housing for feeding the crop material from a header into the open mouth.

The impeller feed section includes a mounting hub at a forward end of the rotor; a plurality of impeller blades, known colloquially as elephant ears, arranged at spaced positions around the axis so as to extend generally longitudinally of the rotor and curved to cause an air flow rearwardly as the blade portion rotates about the axis; where each impeller blade includes an inner mounting portion connected to the mounting hub and an outwardly extending blade portion. Each blade portion defines a forward blade edge and an outer blade edge, with the forward blade edges of the blades lying substantially in an imaginary common front radial plane of the impeller section at the front feed mouth and the outer blade edges lying substantially in an imaginary frusto-conical surface just inside the frusto-conical housing portion.

It is well known and an ongoing concern that this arrangement has a considerable difficulty in effecting the necessary feeding action in some crop conditions. Extensive efforts have been applied to overcoming this problem including particularly changes to the front wear bar which is attached along the forward edges of the blades. Up till now little improvement has been achieved.

SUMMARY OF THE INVENTION

It is one object of the present invention, therefore, to provide an improved feed arrangement for a rotary or axial flow combine harvester of the type including the construction set forth above.

According to the invention there is provided an improvement in which the shape of the blade portion defining an inclined edge which joins the forward blade edge at a first position spaced outwardly from the hub and joins the outer blade edge at a second position spaced rearwardly of the first position, the inclined edge being inclined at an angle to the outer blade edge such that the first position is spaced inwardly of an imaginary intersection of an extrapolation of the forward blade edge and an extrapolation of the outer blade edge.

Preferably the inclined edge extends outwardly and rearwardly from the first position to the second position such that the radial distance of the second position from the axis is greater than that of the first position.

Preferably wherein a distance from the hub to the first position is in the range 50 to 75% of the distance from the hub to the housing portion.

Preferably a portion or the full length of the inclined edge is straight or substantially straight. If the inclined edge is slightly curved, it has at least a portion which has a radius of curvature greater than that at the joins with the forward edge and the outer edge. It is clear therefore that the inclined edge is distinguished from merely the type of curved edge which occur conventionally in the join between the forward edge and the outer edge in the conventional arrangement.

Preferably the inclined edge is longer in length than the forward edge.

Preferably the forward blade edge carries a reinforcing strip and wherein the inclined edge is without reinforcing strip.

One embodiment of the invention will now be described in conjunction with the accompanying drawings in which:

BRIEF DESCRIPTION OF THE DRAWINGS

FIG. 4 is an isometric view of a conventional blade or "elephant ear" as used in the feed section FIGS. 1 and 2.

FIG. 5 is an isometric view of a blade or "elephant ear" according to the present invention as used in the feed section of FIGS. 1 and 2.

FIG. 6 is an isometric view of a blade or "elephant ear" according to the present invention as used in the feed section of FIGS. 1 and 2.

In the drawings like characters of reference indicate corresponding parts in the different figures.

DETAILED DESCRIPTION

Figure 1:
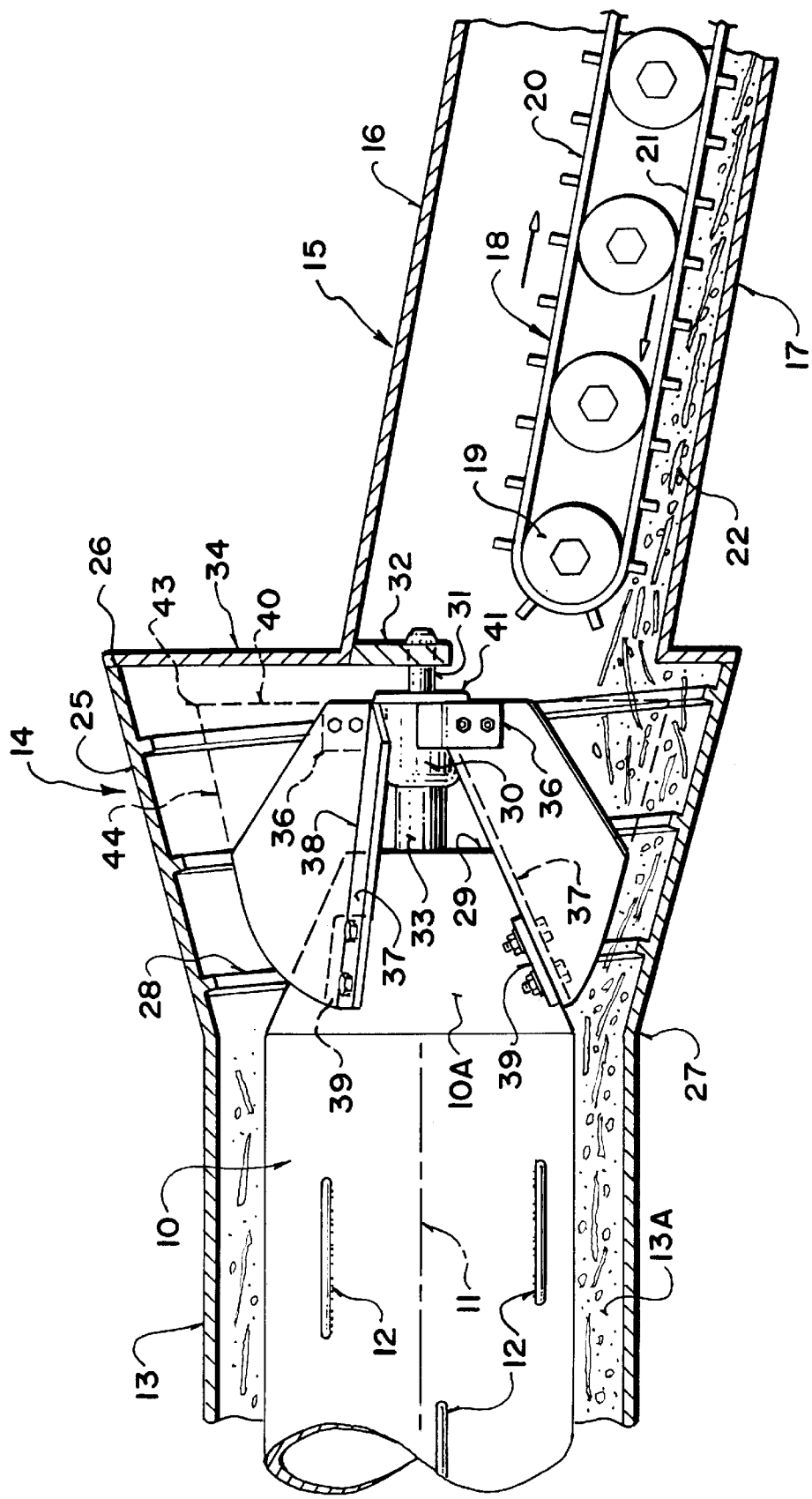
FIG. 1 is a vertical cross-sectional view of a feed section of a rotary combine harvester according to the present invention.
Figure 2:
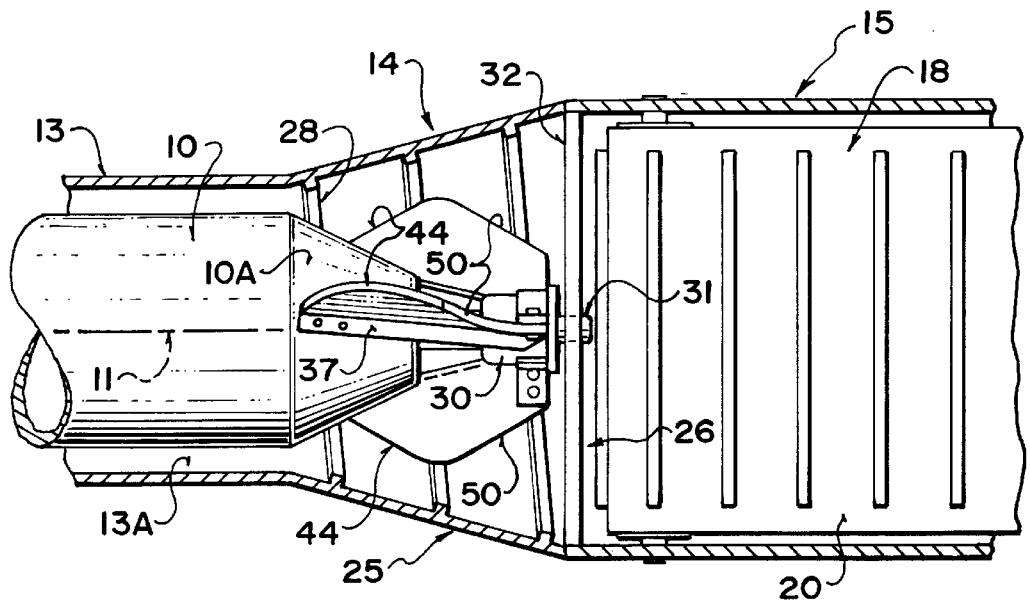
FIG. 2 is a horizontal cross-sectional view of the elements of FIG. 1.
Figure 3:
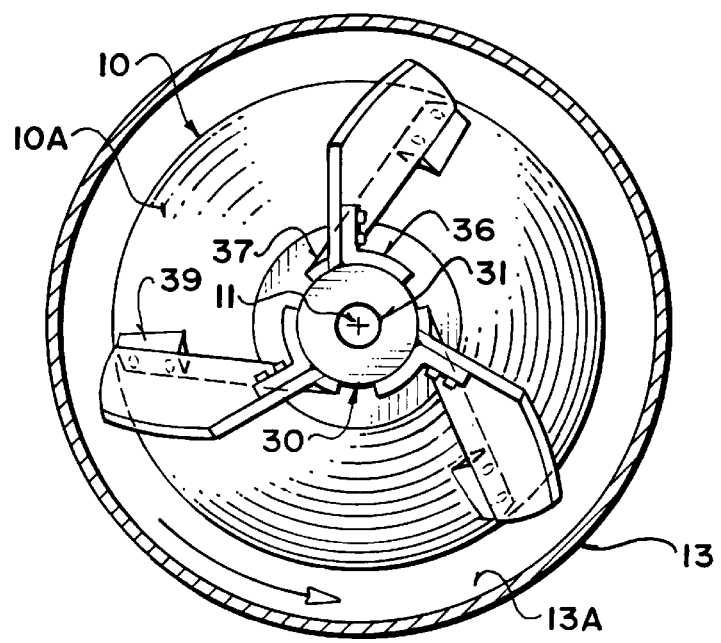
FIG. 3 is a front elevational view of the rotor of FIG. 1.

In FIGS. 1, 2 and 3 is shown the feed section only of a combine harvester of the type including a rotor 10 mounted for rotation about an axis 11 such that crop material passing along the outside surface of the rotor travels in an axial direction "axial flow" as the rotor rotates. The rotor carries on its outside cylindrical surface a plurality of rasp bars shown schematically at 12 which cooperate with a cylindrical concave section 13 which surrounds the outside surface of the rotor and carries a series of concaves to effect a threshing and separating action on the crop material around and along the rotor. The details of the rotor are shown only schematically since these vary widely in accordance with the type of machine and the type of crop material and since these are well known to one skilled in the art.

The rotor includes a feed section generally indicated at 14 which receives crop material from a feeder housing 15.

The feeder housing 15 is again of a conventional construction including an upper wall 16, a bottom wall 17 and a belt or chain conveyor 18. The conveyor 18 includes a plurality of drive and guide rollers 19 forming an upper run 20 and a lower run 21 of the conveyor. The lower run 21 moves upwardly along the bottom wall 17 and carries a crop material 22 sliding across the bottom wall. The crop material is thus fed into the feed section 14 of the rotor to be picked up by the movement of the rotor and carried rearwardly.

The feed section 14 comprises a generally frusto-conical wall section 15 which converges from a forward open mouth 16 rearwardly and inwardly to an inner edge 17 which coincides with or joins with the forward end of the concave section 13. The wall 15 carries a helical guide rib 18 on the inside surface. The forward end of the rotor 10 converges inwardly to a forward most front surface 19. Forward of the front surface 19 is carried a hub 30 surrounding the axis 11. The hub 30 and the rotor 29 are mounted for rotation about a longitudinal shaft 31 carried at its forward end in a suitable support bracket 32. The hub 30 is connected to the rotor 10 by a sleeve 33 again surrounding the shaft 31.

The walls 15 and 17 of the feeder housing connect to a front wall 34 covering the front face 26. Thus the opening at the rear feeder housing communicates with a suitable opening in the front wall 34 to provide crop material to pass into the front open face of the feed section 14.

The rotor carries a plurality of impeller blades for rotation with the rotor within the feed section 14. The impeller blades are conventionally known as "elephant ears" because of the particular shape of these elements.

Each elephant ear or blade is mounted on a respective one of a plurality of brackets 36 mounted at spaced positions around the hub 30. Each blade has an inner flange 37 extending along an inner edge 38. A forward edge of the flange 37 sits on the cylindrical peripheral surface of the hub 30. The flange 37 extends rearwardly and outwardly and connects to a bracket 39 attached to the inclined converging front section 10A of the rotor 10. Thus the blade is supported at its forward end of the hub and at its rearward end on the inclined section of the rotor. The blade includes a blade surface which extends outwardly from the rotor. The blade curves outwardly and angularly rearwardly relative to the direction of rotation so that rotation of the rotor causes rotation of the blades around the axis 11 so that air is driven rearwardly by the impeller causing the crop material also to be driven rearwardly into the cylindrical space 13A outside the rotor and inside the concave section.

A conventional blade is shown in FIG. 4 and is shown in dotted line in FIG. 1. The conventional blade includes a forward edge 40 lying in a common plane with the front surface 41 of the hub 31. Thus the forward edge of each of the blades lies in a common radial plane surrounding the axis 11 just rearward of the front open mouth 26. The forward edge extends outwardly to an outer most apex 43 which is spaced slightly inwardly from the inside surface of the conical section 25. The blade includes an outer edge 44 which joins the front edge 40 at the apex 43 and from the apex 43 converges inwardly and rearwardly to join with the inner edge 38 at a position at the rear 45 of the flange 37.

The outer edge 44 is shaped to follow substantially the cone angle of the frusto-conical section 25 so that the outer edge also lies in an imaginary frusto-conical surface common to the outer edge of each of the other blades. The spacing between the outer edges 44 and the inside of the frusto-conical section 25 is maintained so as to allow the crop material to pass around and through this area into the cylindrical section 13A.

The conventional blade as shown in FIG. 4 carries on one side surface of the blade a wear plate 46 which is bolted to the blade by bolts 47. Two holes 48 are provided in the blade adjacent to but spaced outwardly from the flange 37 for bolting to the bracket 36. The flange 37 carries holes 49 for bolting to the bracket 39.

It will be noted that the flange 37 does not lie parallel to the axis but instead inclines outwardly away from the axis from the hub which is of smaller diameter to an outer part of the frusto-conical surface 10A of the rotor 10. This shape is arranged relative to the position and shape of the forward edge and the outer edge so as to maintain the forward edge and the radial plane as previously described and the outer edge in the imaginary frusto-conical surface which lies at a common cone angle to the frusto-conical portion 25.

Turning now to the modified embodiments shown in FIGS. 1, 2, 5 and 6, the blade is substantially as previously described except that the blade is shaped with an additional edge 50 which is an inclined edge extending from the forward edge 40A to the outer edge 44A.

The forward edge 40A lies in the common radial plane previously described but is reduced in length as it extends only to an apex 43A. First position 43A is less than 75% of the distance from the inner edge 30A at the hub to the conventional apex or first position 43 which comprises an imaginary intersection 43B between an extrapolation 44B of the outer edge 44 and an extrapolation 40B the forward edge 40 as illustrated at 43B in FIG. 5. The length of the portion from the point 30A to the first position 43A is preferably less than 50% of the length to the imaginary apex 43B. Thus, as defined above, the first position or apex 43A is spaced radially inwardly of the imaginary intersection 43B of the extrapolation 40B of the forward blade edge 40A and the extrapolation 44B of the outer blade edge 44.

The edge 50A is inclined rearwardly and outwardly from the first position 43A to a second position 50A at which the edge 50 intersects with the outer edge 44A. As the edge 50 is inclined outwardly, the radial distance from the axis 11 of the first position 43A is less than the radial distance of the second position 50A. The position 50A lies on the outer surface 44A and therefore is at a position in the conventional frusto-conical surface previously described. The remainder of the edge 50 is recessed inwardly from the conventional imaginary frusto-conical surface and therefore leaves a space between the outer edge of the blade as defined by the edge 50 and the inside surface of the frusto-conical portion 25 which is greater than that in the conventional system.

The edge 50 is preferably cut in a straight direction with no curvature. However it will be appreciated that a slight curvature may be applied. However any curvature will of course have a radius of curvature which is greater than that of the sharp curvatures at the first position 43A and the second position 50A. It will be appreciated that the edges are generally not cut at sharp angles but instead either are cut with a short radiused section or become radiused by wear. It is not intended that the present invention be limited to an edge 50 which is exactly straight but it will be appreciated that the edge 50 is significantly different from the conventional radiused corner of the conventional blade as shown at the apex 43 in FIG. 4.

As shown in FIG. 6, a modified arrangement is shown which has the characteristics as that shown in FIG. 5. However in FIG. 6 the length of the forward edge 40A to the first position 43C is longer than that of FIG. 5 and the angle of the edge 50B to the second position 50C is increased relative to the forward edge 40A. Thus the inclined edge is substantially parallel to the inner edge 38 at the flange 37. As the flange is inclined outwardly when installed, the radial distance of the position 50C is still slightly greater than that of the position 43C. In alternative arrangements, the angle of the inclined edge can be varied to obtain the best feeding effect.

The wear plate 46 also terminates at the position 43C and there is no separate wear plate which extends along the edge 50B nor along the edge 44A. The wear plate 46 has some width so that it extends partly along the edge 50B but no additional wear plate is provided or bolted to the blade.

Although the rotor is shown with three blades, rotors using more or less blades can also be provided and the number of blades is not restrictive in the present invention.

The inventor has found that the feeding action by which the crop material can enter into the feeding zone 14 is significantly improved by the simple expedient of providing the outer edge 50. In this way the portion of the forward edge which extends out to the imaginary apex 43B is removed and the crop material can enter this area more readily without impacting upon what appears in some cases to be a substantially solid front surface lying in the common radial plane of the front edges. The rotor is rotating relatively rapidly so that in some cases it is difficult to feed pass this edge into the area behind the edge where the air stream can pull the crop material around and along the rotor. The inventor has thus found that this improved feeding effect through the area at the front edge of the blades surprisingly enhances the feeding effect despite the fact that the airflow is reduced due to the reduced area of the blades.

It is well known that conventionally the number of blades can vary from a minimum of two upwardly and therefore the number of three as shown is merely exemplary.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. In an axial flow combine harvester for harvesting a crop material comprising:
    a combine rotor having a generally cylindrical body defining an outer rotor surface and mounted for rotation about a longitudinal axis of the body;
    a generally cylindrical concave assembly in which the rotor is mounted for rotation such that the rotor is substantially surrounded by a plurality of concave elements facing inwardly and arranged to cooperate with the outer rotor surface for effecting a threshing and separating action on the crop material passing through a generally cylindrical area between the rotor and the concave assembly;
    an impeller feed section at a forward end of the rotor and rotatable therewith for feeding the crop material rearwardly into the cylindrical area;
    a generally frusto-conical housing portion surrounding the impeller feed section and converging inwardly and rearwardly from a front feed mouth to the concave assembly such that rotation of the impeller feed section within the housing portion causes a rearward flow of the crop material from the mouth to the cylindrical area;
    a feeder housing for feeding the crop material from a header into the open mouth;
    the impeller feed section including:
        a mounting hub at a forward end of the rotor
        a plurality of impeller blades arranged at spaced positions around the axis, extending generally longitudinally of the rotor and being curved to cause an air flow rearwardly as the blade portion rotates about the axis;
        each impeller blade including an inner mounting portion connected to the mounting hub and an outwardly extending blade portion;
        each blade portion defining a forward blade edge and an outer blade edge;
        front radial plane of the impeller section at the front feed mouth;
        the outer blade edges lying substantially in an imaginary frusto-conical surface just inside the frusto-conical housing portion;
    wherein the improvement comprises:
        a shape of the blade portion defining an inclined edge which joins the forward blade edge at a first position spaced outwardly from the hub and joins the outer blade edge at a second position spaced rearwardly of the first position, the inclined edge being inclined at an angle to the outer blade edge such that the first position is spaced radially inwardly of an imaginary intersection of an extrapolation of the forward blade edge and an extrapolation of the outer blade edge.

2. The improvement according to claim 1 wherein the inclined edge extends outwardly and rearwardly from the first position to the second position such that the radial distance of the second position from the axis is greater than that of the first position.

3. The improvement according to claim 1 wherein a distance from the hub to the first position is less than 75% of the distance from the hub to the imaginary intersection between an extrapolation of the outer edge and an extrapolation of the forward edge.

4. The improvement according to claim 1 wherein a distance from the hub to the first position is of the order of 50% of the distance from the hub to the imaginary intersection between an extrapolation of the outer edge and an extrapolation of the forward edge.

5. The improvement according to claim 1 wherein the inclined edge includes at least a portion thereof which is substantially straight.

6. The improvement according to claim 1 wherein the inclined edge is substantially straight along its whole length.

7. The improvement according to claim 1 wherein the inclined edge is longer in length than the forward edge.

8. The improvement according to claim 1 wherein the forward blade edge carries a reinforcing strip and wherein the inclined edge is without reinforcing strip.

9. In an axial flow combine harvester for harvesting a crop material comprising:
    a combine rotor having a generally cylindrical body defining an outer rotor surface and mounted for rotation about a longitudinal axis of the body;
    a generally cylindrical concave assembly in which the rotor is mounted for rotation such that the rotor is substantially surrounded by a plurality of concave elements facing inwardly and arranged to cooperate with the outer rotor surface for effecting a threshing and separating action on the crop material passing through a generally cylindrical area between the rotor and the concave assembly;
    an impeller feed section at a forward end of the rotor and rotatable therewith for feeding the crop material rearwardly into the cylindrical area;

a generally frusto-conical housing portion surrounding the impeller feed section and converging inwardly and rearwardly from a front feed mouth to the concave assembly such that rotation of the impeller feed section within the housing portion causes a rearward flow of the crop material from the mouth to the cylindrical area;

a feeder housing for feeding the crop material from a header into the open mouth the impeller feed section including:

a mounting hub at a forward end of the rotor a plurality of impeller blades arranged at spaced positions around the axis, extending generally longitudinally of the rotor and being curved to cause an air flow rearwardly as the blade portion rotates about the axis;

each impeller blade including an inner mounting portion connected to the mounting hub and an outwardly extending blade portion;

each blade portion defining a forward blade edge and an outer blade edge;

the forward blade edges of the blades lying substantially in an imaginary common front radial plane of the impeller section at the front feed mouth;

the outer blade edges lying substantially in an imaginary frusto-conical surface just inside the frusto-conical housing portion;

wherein the improvement comprises:

a shape of the blade portion defining an inclined edge which joins the forward blade edge at a first position spaced outwardly from the hub and joins the outer blade edge at a second position spaced rearwardly of the first position, the inclined edge having at least a part thereof which is substantially straight and inclined at an angle to the outer blade edge and extends outwardly and rearwardly from the first position to the second position such that the radial distance of the second position from the axis is greater than that of the first position.

10. The improvement according to claim 9 wherein a distance from the hub to the first position is less than 75% of the distance from the hub to an imaginary intersection between an extrapolation of the outer edge and an extrapolation of the forward edge.

11. The improvement according to claim 9 wherein the inclined edge is substantially straight along its whole length.

12. The improvement according to claim 9 wherein the inclined edge is substantially parallel to an inner edge of the blade.

13. The improvement according to claim 9 wherein the inclined edge is longer in length than the forward edge.

14. In an axial flow combine harvester for harvesting a crop material comprising:

a combine rotor having a generally cylindrical body defining an outer rotor surface and mounted for rotation about a longitudinal axis of the body;

a generally cylindrical concave assembly in which the rotor is mounted for rotation such that the rotor is substantially surrounded by a plurality of concave elements facing inwardly and arranged to cooperate with the outer rotor surface for effecting a threshing and separating action on the crop material passing through a generally cylindrical area between the rotor and the concave assembly;

an impeller feed section at a forward end of the rotor and rotatable therewith for feeding the crop material rearwardly into the cylindrical area;

a generally frusto-conical housing portion surrounding the impeller feed section and converging inwardly and rearwardly from a front feed mouth to the concave assembly such that rotation of the impeller feed section within the housing portion causes a rearward flow of the crop material from the mouth to the cylindrical area;

a feeder housing for feeding the crop material from a header into the open mouth;

the impeller feed section including:

a mounting hub at a forward end of the rotor a plurality of impeller blades arranged at spaced positions around the axis, extending generally longitudinally of the rotor and being curved to cause an air flow rearwardly as the blade portion rotates about the axis;

each impeller blade including an inner mounting portion connected to the mounting hub and an outwardly extending blade portion;

each blade portion defining a forward blade edge and an outer blade edge;

front radial plane of the impeller section at the front feed mouth;

the outer blade edges lying substantially in an imaginary frusto-conical surface just inside the frusto-conical housing portion;

wherein the improvement comprises:

a shape of the blade portion defining an inclined edge which extends substantially parallel to the axis, joins the forward blade edge at a first position spaced outwardly from the hub and joins the outer blade edge at a second position spaced rearwardly of the first position, the inclined edge being inclined at an angle to the outer blade edge such that the first position is spaced radially inwardly of an imaginary intersection of an extrapolation of the forward blade edge and an extrapolation of the outer blade edge.

* * * * *